United States Patent
Dhanakshirur et al.

(10) Patent No.: US 12,045,624 B2
(45) Date of Patent: Jul. 23, 2024

(54) TRANSFERRING LOG DATA FROM PRE-OS ENVIRONMENT TO PERSISTENT STORE

(71) Applicant: Dell Products, L.P., Round Rock, TX (US)

(72) Inventors: Krutika Dhanakshirur, Bagalkot (IN); Sasikumar Subramani, Bangalore (IN); Vivek S, Bangalore (IN); Harish Babu, Bangalore (IN); Santosh Gore, Bangalore (IN)

(73) Assignee: DELL PRODUCTS, L.P., Round Rock, TX (US)

( * ) Notice: Subject to any disclaimer, the term of this patent is extended or adjusted under 35 U.S.C. 154(b) by 161 days.

(21) Appl. No.: 17/491,737

(22) Filed: Oct. 1, 2021

(65) Prior Publication Data
US 2023/0104089 A1    Apr. 6, 2023

(51) Int. Cl.
G06F 21/57    (2013.01)
G06F 9/4401   (2018.01)

(52) U.S. Cl.
CPC ......... G06F 9/4406 (2013.01); G06F 21/575 (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 2012/0191960 A1* | 7/2012 | Piwonka | ................. | G06F 9/441 713/2 |
| 2013/0125107 A1* | 5/2013 | Bandakka | ........... | G06F 11/1433 717/171 |
| 2015/0293820 A1* | 10/2015 | Doshi | ................... | G06F 3/0644 711/162 |
| 2016/0188345 A1* | 6/2016 | Chen | ..................... | G06F 9/4403 713/2 |
| 2021/0365561 A1* | 11/2021 | Wang | .................. | G06F 11/0772 |
| 2023/0115901 A1* | 4/2023 | Rivera | ................. | G06F 21/575 707/654 |

* cited by examiner

*Primary Examiner* — Fahmida Rahman
(74) *Attorney, Agent, or Firm* — Amin, Turocy & Watson, LLP

(57) ABSTRACT

Facilitation of transfer of pre-operating system (pre-OS) data to a persistent store is enabled relative to an operation performed external to the OS. A system can comprise a processor, and a memory that stores computer executable instructions that, when executed by the processor, can facilitate performance of operations. The operations can comprise writing data relative to a pre-OS environment to a partition external to an operating system (OS) partition, and, in response to a reboot operation, booting an OS and transferring the data or a copy of the data to the OS partition. Alternatively, the operations can comprise, writing data relative to an updating operation to a log accessible by an OS of the system, assigning a variable value to the log, automatically searching, while operating the OS, for the variable value, and copying or transferring the data relative to the OS via identifying the variable value upon the identification.

20 Claims, 10 Drawing Sheets

TRANSFERRING LOG DATA FROM PRE-OS ENVIRONMENT TO PERSISTENT STORE

BACKGROUND

System updates, such as device firmware updates can be integral to ensuring continued high performance of a system. Reviewing operation of such system updates can inform one or more repair, supplemental update and/or future update operations.

SUMMARY

The following presents a simplified summary of the disclosed subject matter to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can comprise a processor and a memory that stores computer executable instructions that, when executed by the processor, facilitate performance of operations. The operations can comprise writing data relative to a pre-operating system (pre-OS) environment to an external partition that is external to an operating system (OS) partition, and, in response to a reboot operation, booting an OS and transferring the data or a copy of the data to the OS partition.

An example method can comprise, in response to performance of an updating operation to a system, writing, by the system comprising a processor, data relative to the updating operation to a log accessible by an operating system (OS) of the system, assigning, by the system, a variable value to the log, automatically searching, by the system, while operating the OS, for the variable value, and in response to identifying the variable value, copying or transferring, by the system, the data of the log relative to the OS.

An example non-transitory machine-readable medium can comprise instructions that, when executed by a processor, can facilitate performance of operations. These operations can comprise storing pre-operating system (OS) data, initiating a request to generate an authorization token, creating an application session relative to the pre-OS data and having an ID of the generated authorization token, and employing the application session to copy the pre-OS data to a system management controller partition prior to booting the operating system (OS).

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
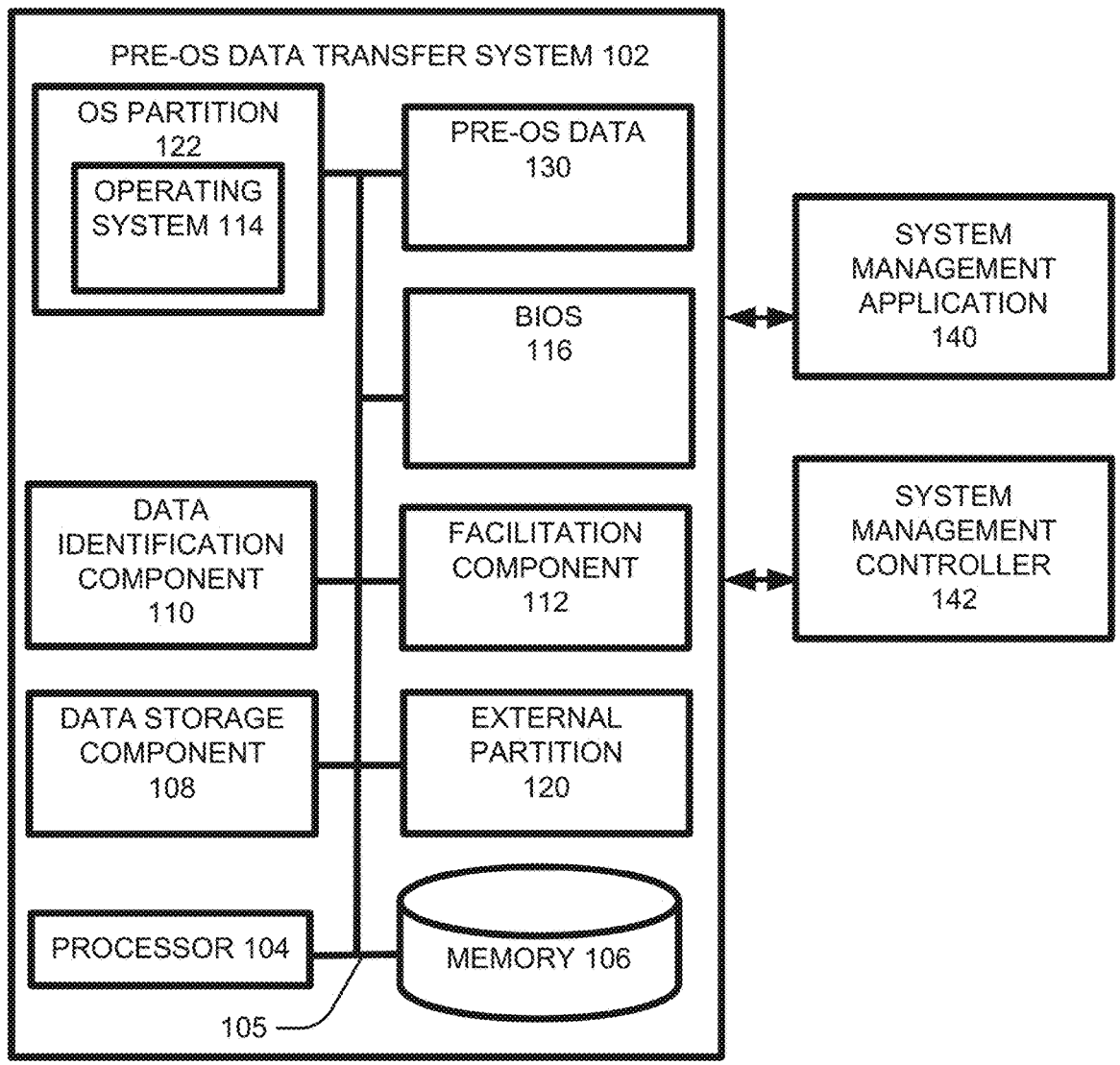
FIG. 1 illustrates an example system architecture that can facilitate a process to transfer pre-operating system data to a persistent store, relative to an operation performed external to an operating system environment, in accordance with one or more embodiments described herein.

Performance of a system update, such as device update, firmware update, software update and/or OS update can encounter one or more issues, failures, bugs and/or other inadequacies. However, review of data relative to such update performance, such as log data, can be difficult, if not impossible, due to existing procedures to remove, delete and/or otherwise clean up such data after the update performance. This can be the case regardless of the utility of such data to inform one or more repair, supplemental update and/or future update operations.

That is, obtaining and/or recreating such data can be a very difficult and/or impossible task for one or more maintenance entities. Further, loss of such data can be a hinderance to training of one or more new maintenance entities and/or one or more maintenance entities lacking previous experience and/or data relative to a particular device, software, system and/or firmware.

As used herein, an "entity" can refer to a machine, device, smart device, component, hardware, software and/or human.

Furthermore, the removal, deletion and/or otherwise cleaning up of such data can cause increased loss of time and/or resources, in addition to that for facilitating a fix, due to responding to one or more communications regarding the issue, failure and/or bug. For example, a user entity can determine that an update failed and further can be unable to locate pre-OS data relative to such failure for providing to a maintenance entity. In another example, a user entity can search for historical data relative to failure and/or success of one or more pre-OS operations, such as updates and/or other operations, but can be unable to locate such data due to its deletion, and thus can be unable to train on the data. In yet another example, using server history, a user entity can attempt to prepare a data set regarding updating to a server employing a pre-boot (e.g., pre-OS environment). However, the user entity can be unable to return such data due to a lack of a source from which to fetch the information.

In general, techniques provided by one or more embodiments of systems, methods and/or non-transitory machine-readable mediums herein can address one or more of the aforementioned problems, issues, concerns and/or deficiencies. For example, one or more operations performed by one or more embodiments described herein can be saving and/or otherwise providing data for addressing one or more issues, failures and/or bugs relative to a pre-OS operation, such as a system, device and/or firmware update. Data generated relative to such update still can be removed and/or cleaned up relative to pre-OS storage, such as partitions. Yet, such data also can be transferred and/or copied to persistent storage accessible by one or more applications operating in an OS environment, such as after boot and/or reboot of such OS system.

Put another way, a system, method and/or non-transitory machine-readable medium of one or more embodiments described herein, can be employed to transfer, such as move and/or copy, data generated relative to one or more pre-operating system (pre-OS operations), such as system, firmware and/or device updates to a persistent store. That is, subsequent to performance of the one or more pre-OS operations, the data can be retained and utilized. Such data can be stored and/or otherwise saved instead of being deleted, as in existing systems. The data, such as one or more logs and/or other reports can be employed to train, fix, repair, review and/or otherwise inform relative to the pre-OS operations and/or relative to future iterations of such pre-OS operations.

As contrasted with one or more existing techniques, by employing the one or more embodiments herein, one or more maintenance entities can reduce and/or altogether omit timely, costly and inefficient recreation of a pre-OS operation failure, issue and/or bug. That is, such recreation can be difficult if not impossible due in one or more cases to inability to ideally recreate all variables and/or inability to understand actual causation absent review of respective log data. Further, pre-OS storage space can be reclaimed. Further, damage to a reputation of a product, program, device, software and/or firmware having the failure, issue and/or bug can reduce and/or altogether prevented via efficient review and subsequent addressing of such failure, issue and/or bug, such as in minimal time, at minimal cost and/or with minimal effort.

As used herein, the term "cost" can refer to power, money, memory, processing power and/or the like.

Example Architecture

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 1000 illustrated at FIG. 10. In one or more described embodiments, computer and/or computing-based elements can be used in connection with implementing one or more of the systems, devices, components and/or computer-implemented operations shown and/or described in connection with FIG. 1 and/or with other figures described herein.

Turning first to FIG. 1, an example of an architecture is illustrated, with description being provided below. While referring here to one or more processes, operations, facilitations and/or uses of the non-limiting system architecture 100, it will be appreciated that description provided herein, both above and below, also can be relevant to one or more other non-limiting system architectures described herein.

Illustrated at FIG. 1 is an example non-limiting system architecture 100 that can facilitate a process to transfer pre-operating system (pre-OS) data to a persistent store, relative to an operation performed external to an operating system (OS) environment. The non-limiting system architecture 100 can be employed for storing and/or saving the pre-OS data and for facilitating transfer and/or copy of the data to a persistent store, such as accessible employing an OS environment. The facilitation of the transfer and/or copy can comprise one or more of variable value assigning, variable value identifying, creating an external partition, deleting an external partition, temporarily storing data, generating an authorization token, creating an application session, triggering data collection, applying an application session identifier, and/or employing a basic input/output (BIOS) system.

As illustrated at FIG. 1, the non-limiting system architecture 100 can comprise a pre-OS data transfer system 102. The pre-OS data transfer system 102, as illustrated, can comprise any suitable type of component, machine, device, facility, apparatus and/or instrument that comprises a processor and/or can be capable of effective and/or operative communication with a wired and/or wireless network. All such embodiments are envisioned. For example, pre-OS data transfer system 102 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the pre-OS data transfer system 102 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

In one or more embodiments, the pre-OS data transfer system 102 can be associated with, such as accessible via, a cloud computing environment. In one or more embodiments, the pre-OS data transfer system 102 can function in cooperation with and/or as part of another operating environment, such as the operating environment 1000 illustrated at FIG. 10.

It will be appreciated that operation of the non-limiting system architecture 100 and/or of the pre-OS data transfer system 102 is not limited to facilitating a single pre-OS data transfer. For example, the pre-OS data transfer system 102 can facilitate a process to transfer plural pre-operating system datas, such as plural logs, to one or more persistent stores, relative to an operation performed external to an operating system environment. Likewise, the pre-OS data transfer system 102 can facilitate plural such transfers in parallel. Further, the pre-OS data transfer system 102 can facilitate one or more such transfers relative to one or more pre-OS operations (e.g., operations performed external to an operating system environment).

The pre-OS data transfer system 102 can comprise one or more components, such as a memory 106, processor 104, bus 105, data storage component 108, facilitation component 112, operating system (OS) 114, external partition 120 and/or OS partition 122. In one or more embodiments, the pre-OS data transfer system 102 further can comprise a data identification component 110 and/or basic input/output system (BIOS) 116.

Generally, an embodiment of the pre-OS data transfer system 102 can write data, such as pre-OS data 130 relating to a pre-operating system (pre-OS) environment, to an external partition 120 that is external to an operating system (OS) partition 122 (e.g., persistent store). Further, the pre-OS data transfer system 102 can, in response to a boot operation, such as an initial boot or reboot, also booting the OS 114 and transferring the pre-OS data 130 or a copy of the pre-OS data 130 to the OS partition 122.

That is, generally, pre-OS data transfer system 102 can facilitate processes to temporarily store pre-OS data 130, identify stored pre-OS data 130 and transfer, such as send and/or copy, the pre-OS data 130 to a persistent store. It will be appreciated that although particular one or more functions are described below as being performed by certain of the one or more components of the pre-OS data transfer system 102, it will be appreciated that in one or more other embodiments, one or more processes performed by one or more of the components can be performed by one or more others of the components.

One or more communications between one or more components of the non-limiting system architecture 100, and/or between a system management application 140, to be discussed below, and the non-limiting system architecture 100, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 104, memory 106 and bus 105 of the pre-OS data transfer system 102.

For example, in one or more embodiments, pre-OS data transfer system 102 can comprise a processor 104 (e.g., computer processing unit, microprocessor, classical processor, quantum processor and/or like processor). In one or more embodiments, a component associated with pre-OS data transfer system 102, as described herein with or without reference to the one or more figures of the one or more embodiments, can comprise one or more computer and/or machine readable, writable and/or executable components and/or instructions that can be executed by processor 104 to facilitate performance of one or more processes defined by such component(s) and/or instruction(s). In one or more embodiments, the processor 104 can comprise the data storage component 108, facilitation component 112, OS 114, external partition 120, OS partition 122, data identification component 110 and/or BIOS 116.

In one or more embodiments, the pre-OS data transfer system 102 can comprise a machine-readable memory 106 that can be operably connected to the processor 104. The memory 106 can store computer-executable instructions that, upon execution by the processor 104, can cause the processor 104 and/or one or more other components of the pre-OS data transfer system 102 (e.g., data storage component 108, facilitation component 112, OS 114, external partition 120, OS partition 122, data identification component 110 and/or BIOS 116) to perform one or more actions. In one or more embodiments, the memory 106 can store computer-executable components (e.g., data storage component 108, facilitation component 112, OS 114, external partition 120, OS partition 122, data identification component 110 and/or BIOS 116).

Pre-OS data transfer system 102 and/or a component thereof as described herein, can be communicatively, electrically, operatively, optically and/or otherwise coupled to one another via a bus 105 to perform functions of non-limiting system architecture 100, pre-OS data transfer system 102 and/or one or more components thereof and/or coupled therewith. Bus 105 can comprise one or more of a memory bus, memory controller, peripheral bus, external bus, local bus, quantum bus and/or another type of bus that can employ one or more bus architectures. One or more of these examples of bus 105 can be employed to implement one or more embodiments described herein.

In one or more embodiments, pre-OS data transfer system 102 can be coupled (e.g., communicatively, electrically, operatively, optically and/or like function) to one or more external systems (e.g., a system management application), sources and/or devices (e.g., classical and/or quantum computing devices, communication devices and/or like devices), such as via a network. In one or more embodiments, one or more of the components of the non-limiting system architecture 100 can reside in the cloud, and/or can reside locally in a local computing environment (e.g., at a specified location(s)).

In addition to the processor 104 and/or memory 106 described above, pre-OS data transfer system 102 can comprise one or more computer and/or machine readable, writable and/or executable components and/or instructions that, when executed by processor 104, can facilitate performance of one or more operations defined by such component(s) and/or instruction(s).

Turning now to one or more operations of the pre-OS data transfer system 102, the data storage component 108 can be employed to receive, upload, download and/or otherwise obtain pre-OS data 130. The pre-OS data 130 can be received by the pre-OS data transfer system 102, such as by a component and/or aspect of the pre-OS data transfer system 102, such as the memory 106, a mail component and/or a download component, other than the data storage component 108.

The pre-OS data 130 can be contained in any suitable format, using any suitable language. Pre-OS data 130 can comprise one or more of a log, report, lookup table, text document, spreadsheet, binary text, computer code and/or the like.

In one or more embodiments, the data storage component 108 can write one or more aspects of the pre-OS data 130 and/or generate one or more aspects of the pre-OS data 130, such as a log and/or report. This writing and/or generation can be performed relative to the execution of a pre-OS operation, such as an application, microservice and/or firmware operating in a pre-OS environment. For example, one or more updating applications can execute in a pre-OS environment, such as to update the non-limiting system architecture 100, a device, software, firmware and/or the OS 114.

In one or more embodiments, the data storage component 108 can move, send, copy and/or otherwise transfer the pre-OS data 130 to a temporary store, such as a knowledge database, memory and/or partition (e.g., the external partition 120). For example, such temporary store can be accessible to the data storage component 108 in a pre-OS environment (prior to booting of an OS) and further accessible to one or more components of the pre-OS data transfer system 102 in and/or relative to an OS environment, as generated and/or otherwise provided by an OS, such as the OS 114. In one or more embodiments, the temporary store can be accessible to the OS 114. In one or more embodiments, the temporary store can be comprised by the pre-OS data transfer system 102 and/or the data storage component 108. In one or more other embodiments, the temporary store can be disposed, such as located, external to the pre-OS data transfer system 102 and/or external to the non-limiting system architecture 100, but accessible at least to the data storage component 108.

The external partition 120 can be a temporary store, and can be so aptly named in that the external partition 120 can be external to the OS partition 122. In one or more embodiments, the external partition 120 can be comprised by the pre-OS data transfer system 102 and/or the data storage component 108. In one or more other embodiments, the external partition 120 can be disposed, such as located, external to the pre-OS data transfer system 102 and/or external to the non-limiting system architecture 100, but accessible at least to the data storage component 108.

It will be appreciated that the pre-OS data 130 can be written, generated and/or stored in response to execution of a pre-OS operation. As used herein in respect to any aforementioned and below mentioned uses, the term "in response to" can refer to any one or more states including, but not limited to: at the same time as, at least partially in parallel with, at least partially subsequent to and/or fully subsequent to, where suitable. As such, the pre-OS data 130, for example, can be generated at the same time as execution of the pre-OS operation, at least partially in parallel with execution of the pre-OS operation, at least partially subsequent to execution of the pre-OS operation and/or fully subsequent to execution of the pre-OS operation.

In one or more embodiments, the data storage component 108 can facilitate deleting, removal and/or cleaning up of the pre-OS data 130 relative to the pre-OS operation performed relative to which the pre-OS data 130 was written and/or generated. For example, in response to transferring the data to a temporary store, such as the external partition 120, the data storage component 108 can remove the data from the pre-OS application. Again, to further the aforementioned indication, the term "in response to" can refer to any one or more states including, but not limited to: at the same time as, at least partially in parallel with, at least partially subsequent to and/or fully subsequent to.

In one or more embodiments, the data storage component 108 can facilitate deleting, removal and/or cleaning up of the pre-OS data 130 from the temporary store, such as in response to sending, moving, copying and/or otherwise transferring the pre-OS data 130 to a persistent store. For example, while the pre-OS data 130 is being transferred to the persistent store, the pre-OS data 130 also can be removed from the temporary store, and any metadata, tokens, variable values and/or indicators associated therewith also deleted.

Turning now to the sending, moving, copying and/or otherwise transferring of the pre-OS data 130 to a persistent store, such process(es) can be performed and/or facilitated by the facilitation component 112. Such processes can be performed by the facilitation component 112 along, and/or in cooperation or correspondence with one or more other components, such as the data identification component 110, BIOS 116 and/or system management application 140.

That is, the facilitation component 112 can direct, such as triggering, sending one or more signals to, and/or facilitating one or more communications to one or more components to facilitate automatic, manual, triggered and/or any frequency of transferring of the pre-OS data 130 to a persistent store, such as that can be accessible in an OS environment, such as generated by the OS 114. In one or more embodiments, the facilitation component 112 can facilitate sending, moving, copying and/or otherwise transferring the pre-OS data from the temporary store to a persistent store via any suitable method of communication.

In one or more embodiments, the facilitation component 112 can generate one or more variable values including data and/or metadata defining a location of the temporary storage of the pre-OS data. In one or more embodiments, the facilitation component 112 can allocate memory of the non-limiting system architecture 100 such as for using to temporarily store the pre-OS data. The variable value can define the location at the memory. The memory can be a memory of the system, such as being accessible both in a pre-OS environment and an OS environment. In one or more embodiments, the facilitation component 112 can generate and/or direct usage of a token (e.g., authorization token) to generate an application session, such as an HTTPS session to identify and/or move the data. Further description is provided below in connection with FIG. 6.

It will be appreciated that although the OS 114 and OS partition 122 are illustrated at FIG. 1 as being located at the pre-OS data transfer system 102, in one or more other embodiments, the OS 114 and OS partition 122 can be located external to the pre-OS data transfer system 102 and/or external to the non-limiting system architecture 100.

All possibilities are envisioned, including one or more relative to a cloud-based architecture.

The data identification component 110 can employ any suitable technique to identify one or more aspects of pre-OS data 130, such as one or more logs comprising pre-OS data 130. For example, the data identification component 110 can employ machine learning, search algorithms, tree parsing, index searching, variable values, tokens and/or indicators to search for and identify pre-OS data 130. In one embodiment, the data identification component 110 can facilitate searching and/or identifying pre-OS data 130 that has already been generated and/or written. The identification can be communicated to the data storage component 108 for facilitating storage of the pre-OS data 130 at a temporary store, as discussed above. In an embodiment, the data identification component 110 can facilitate searching and/or identifying of pre-OS data 130 that has been stored at a temporary store for transfer by and/or facilitated by the facilitation component 112, such as to a persistent store, as discussed above.

Example Data Transfers

Figure 2:
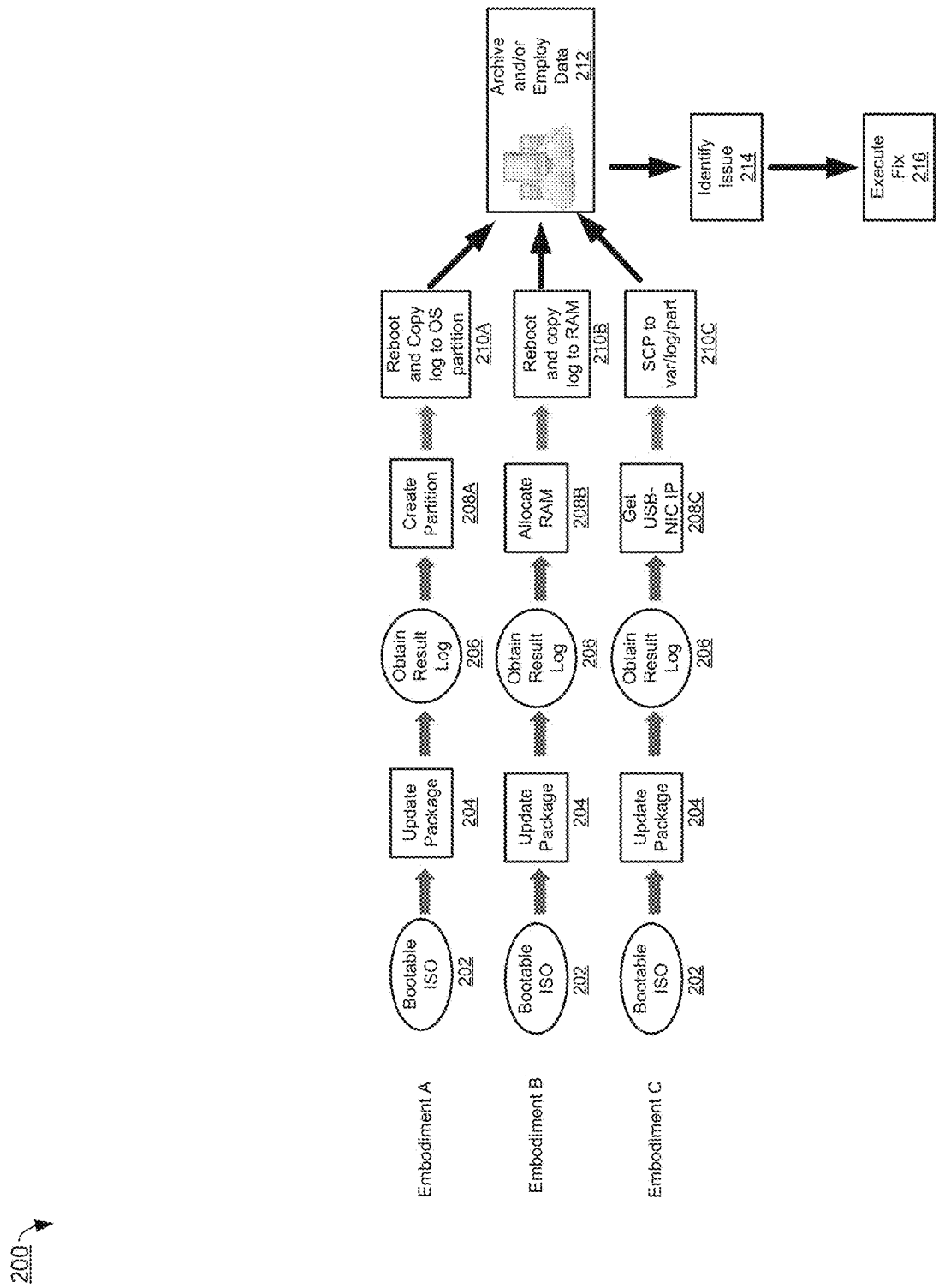
FIG. 2 illustrates various exemplary process diagrams of a data transfer employing the non-limiting system architecture of FIG. 1, in accordance with one or more embodiments described herein.

Turning now to FIG. 2, in addition to still referring to FIG. 1, the pre-OS data transfer system can facilitate various embodiments and/or different operations to facilitate transfer/generation of pre-OS data to the temporary store and/or to the persistent store. In connection with these one or more various embodiments, one or more transfer algorithms can be employed by the pre-OS data transfer system 102, such as by the facilitation component 112. The one or more transfer algorithms each can comprise one or more operations.

At FIG. 2, three embodiments—A, B and C—are generally illustrated. Additional description regarding each embodiment follows, below. At each of embodiments A, B and C, an update 204, such as an update package 204, can be obtained from a bootable ISO 202 (e.g., pre-boot environment). Relative to an update operation performed (e.g., in accordance with the update package 204), a result log can be obtained (e.g., Operation 206). That is, the data storage component 108 can write, generate and/or identify pre-OS data 130, such as contained in a log format.

Next, at each embodiment—A, B, or C—one or more operations (e.g., 208A-C, 210A-C) can be performed to store the pre-OS data 130 at a temporary store. At embodiment A, At embodiment B, At embodiment C.

Regardless of embodiment—A, B or C—the pre-OS data 130 (e.g., at the log) can be archived and/or employed for one or more subsequent purposes (e.g., Operation 212). Archival can be performed by the data storage component 108, for example, employing any one or more of the aforementioned techniques or processes discussed relative to the storage of pre-OS data relative to a temporary store. The pre-OS data can be employed for any suitable purpose, relative to an OS environment, where the pre-OS data was previously unavailable, unsearchable and/or unlocatable. The pre-OS data can be employed for training, reviewing, analysis, issue spotting and/or issue solving. For example, as illustrated at FIG. 2, the pre-OS data can be employed to identify an issue (e.g., Operation 214), such as relative to execution of a respective update package. Once an issue is identified, a fix can be executed (e.g., Operation 216), such as relative to the respective update package 204.

Figure 3:
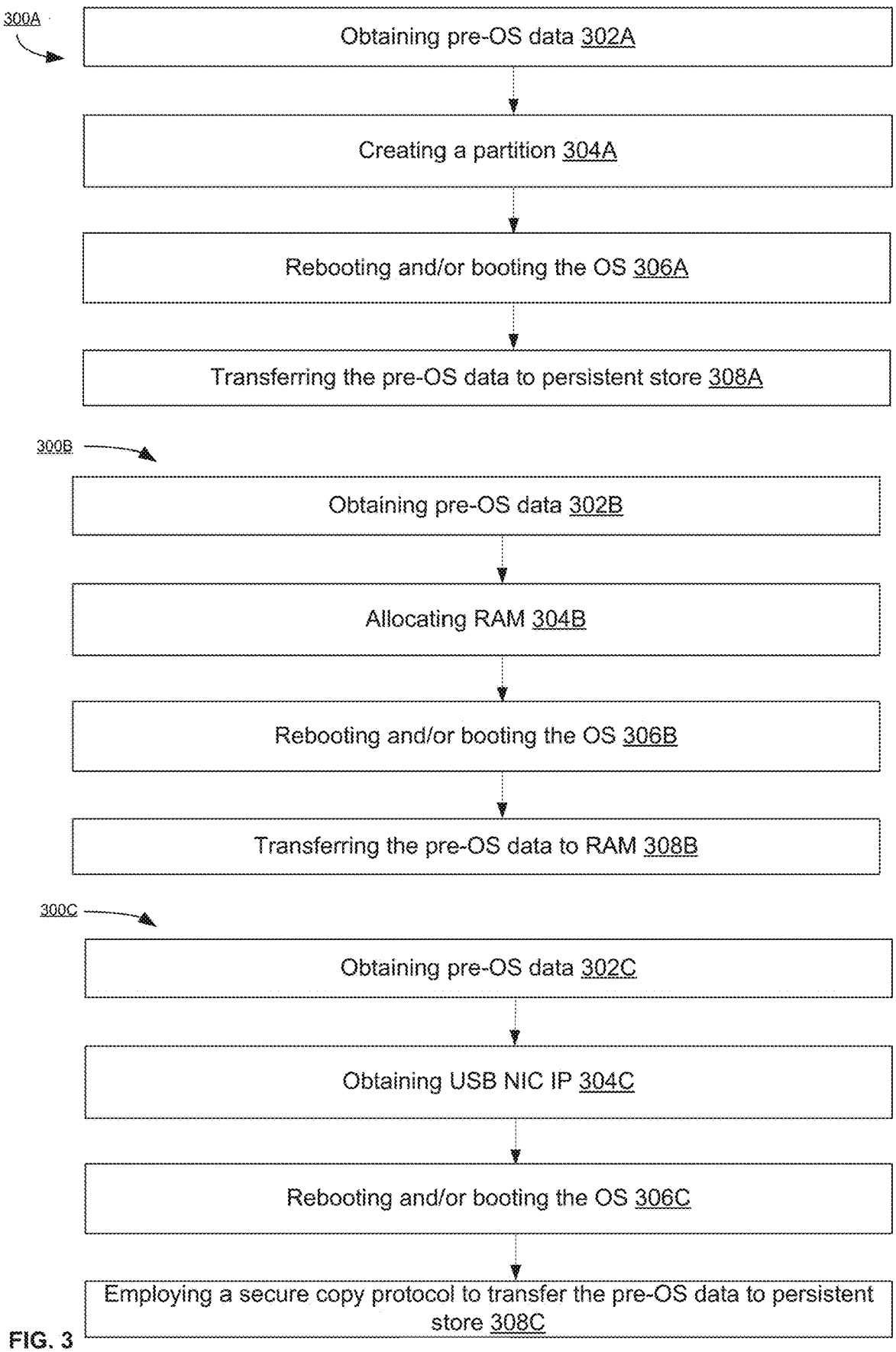
FIG. 3 illustrates various exemplary process flows relative to the various exemplary process diagrams of FIG. 2, in accordance with one or more embodiments described herein.

Accordingly, turning to FIG. 3, one or more basic algorithms for data transfer to a persistent store are illustrated as separate process flow diagrams 300A, 300B and 300C, each of which can facilitate a process to transfer pre-OS data from a temporary store to a persistent store, in accordance with one or more embodiments described herein with respect to the non-limiting system architecture 100. It will be appreciated that these process flow diagrams are not illustrated as comprising, but can comprise, one or more operations for archiving and/or employing the pre-OS data. Repetitive description of like elements and/or processes employed in respective embodiments is omitted for sake of brevity.

A basic transfer algorithm A can comprise execution of the following operations, in accordance with process flow 300A:

Operation 302A can comprise obtaining, by the system (e.g., via data identification component 110 and/or data storage component 108), pre-OS data (e.g., pre-OS data 130).

Operation 304A can comprise creating, by the system (e.g., via facilitation system 112) a partition (e.g., external partition 120).

Operation 306A can comprise rebooting (and/or booting), by the system (e.g., via processor 104) of the OS (e.g., OS 114).

Operation 308A can comprise transferring, such as copying, by the system (e.g., via facilitation system 112) the pre-OS data to persistent store (e.g., OS partition 122).

A basic transfer algorithm B can comprise execution of the following operations, in accordance with process flow 300B:

Operation 302B can comprise obtaining, by the system (e.g., via data identification component 110 and/or data storage component 108), pre-OS data (e.g., pre-OS data 130).

Operation 304B can comprise allocating, by the system (e.g., via facilitation system 112) RAM.

Operation 306B can comprise rebooting (and/or booting), by the system (e.g., via processor 104) of the OS (e.g., OS 114).

Operation 308B can comprise transferring, such as copying, by the system (e.g., via facilitation system 112) the pre-OS data to the RAM (e.g., persistent store).

A basic transfer algorithm C can comprise execution of the following operations, in accordance with process flow 300C:

Operation 302C can comprise obtaining, by the system (e.g., via data identification component 110 and/or data storage component 108), pre-OS data (e.g., pre-OS data 130).

Operation 304C can comprise obtaining, by the system (e.g., via facilitation system 112) a USB-NIC IP (internet protocol), where USB-NIC comprises a communication channel (e.g., a network interface over USB) between the host OS (e.g., OS 114) and the system management control (SMC; e.g., SMC 142). Briefly, the SMC 142 can be a controller, such as a processor or other device, including suitable hardware and/or software, and being configured for employing secure local and remote device management, such as server management.

Operation 306C can comprise rebooting (and/or booting), by the system (e.g., via processor 104) of the OS (e.g., OS 114).

Operation 308C can comprise employing by the system (e.g., via processor 104) a secure copy protocol (SCP) to transfer the pre-OS data (e.g., logs; var/log/) to persistent store (e.g., SMC persistent store).

It will be appreciated that one or more operations employed above can be further described relative to one or more additional flow diagrams, process flow, algorithms and/or embodiments below. Accordingly, it will be appreciated that one or more descriptions and/or functions described below relative to any of FIGS. 4-9 can be applicable to one or more structures, functions, processes and/or operations discussed above with respect to FIGS. 1, 2 and 3.

Additional Example Data Transfers

Figure 4:
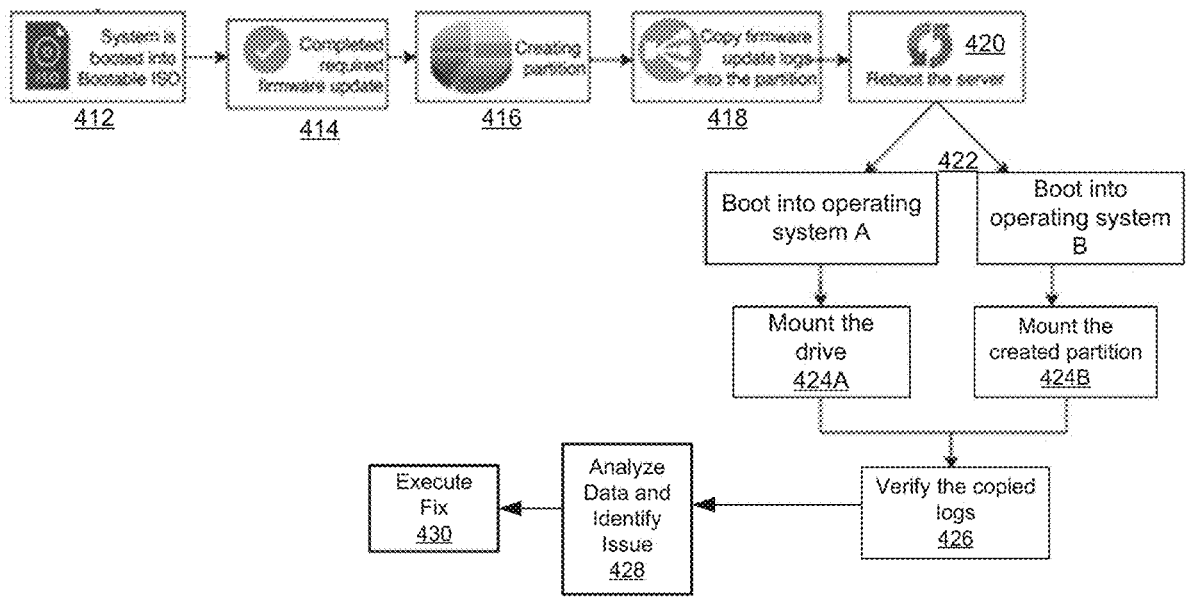
FIG. 4 illustrates an exemplary process diagram of operations to facilitate a process to transfer pre-operating system data to a persistent store, relative to an operation performed external to an operating system environment, in accordance with one or more embodiments described herein.

Referring next to still to the non-limiting system architecture 100 of FIG. 1, and now also to FIG. 4, illustrated is a flow diagram 400 of operations for facilitating a process to transfer pre-operating system data to a persistent store, relative to an operation performed external to an operating system environment. The flow diagram 400 is generally illustrated in accordance with the aforementioned embodiment A, but includes one or more operations and/or expands upon one or more details of one or more of the aforementioned operations relative to aforementioned embodiment A.

The flow diagram 400 includes booting a bootable ISO (e.g., at 412), completing a required firmware update (e.g., at 414) and creating a partition (e.g., at 416). The creation of the partition can be facilitated by the storage component 108, for example. That is, the storage component 108 can partition off storage space from existing storage space of the non-limiting system architecture 100. The pre-OS data from the firmware update can be copied and/or otherwise transferred to the newly-created partition (e.g., at 418), such as by the storage component 108.

Next, the server and/or non-limiting system architecture 100 can be rebooted (e.g., at 420). An OS can be booted at 422, which can be an OS A, such as a Windows®-based OS, or an OS B, such as a Linux®-based OS, for example. Other OS types are envisioned. Relative to the OS A, a drive can be mounted at 424A to copy the pre-OS data from the temporary store (e.g., partition) to the drive relative to the OS. It will be appreciated that the partition can be reformatted and/or removed (e.g., storage space returned to a larger partition) after transfer of the pre-OS data, such as being facilitated by the facilitation component 112. Relative to the OS B, the created partition can be mounted at 424B to transfer the pre-OS data from the partition to the OS B.

Regardless of the OS type, at 426, the copied and/or otherwise transferred pre-OS data can be verified, e.g., that the transfer is complete. This verification can be performed by the storage component 208, for example. After verification, the data can be analyzed and/or an issue identified, such as relative to the firmware update (e.g., 428), such as by an administrating entity. A fix can be executed (e.g., 430), such as by an administrating entity, such as employing the processor 104.

Figure 5:
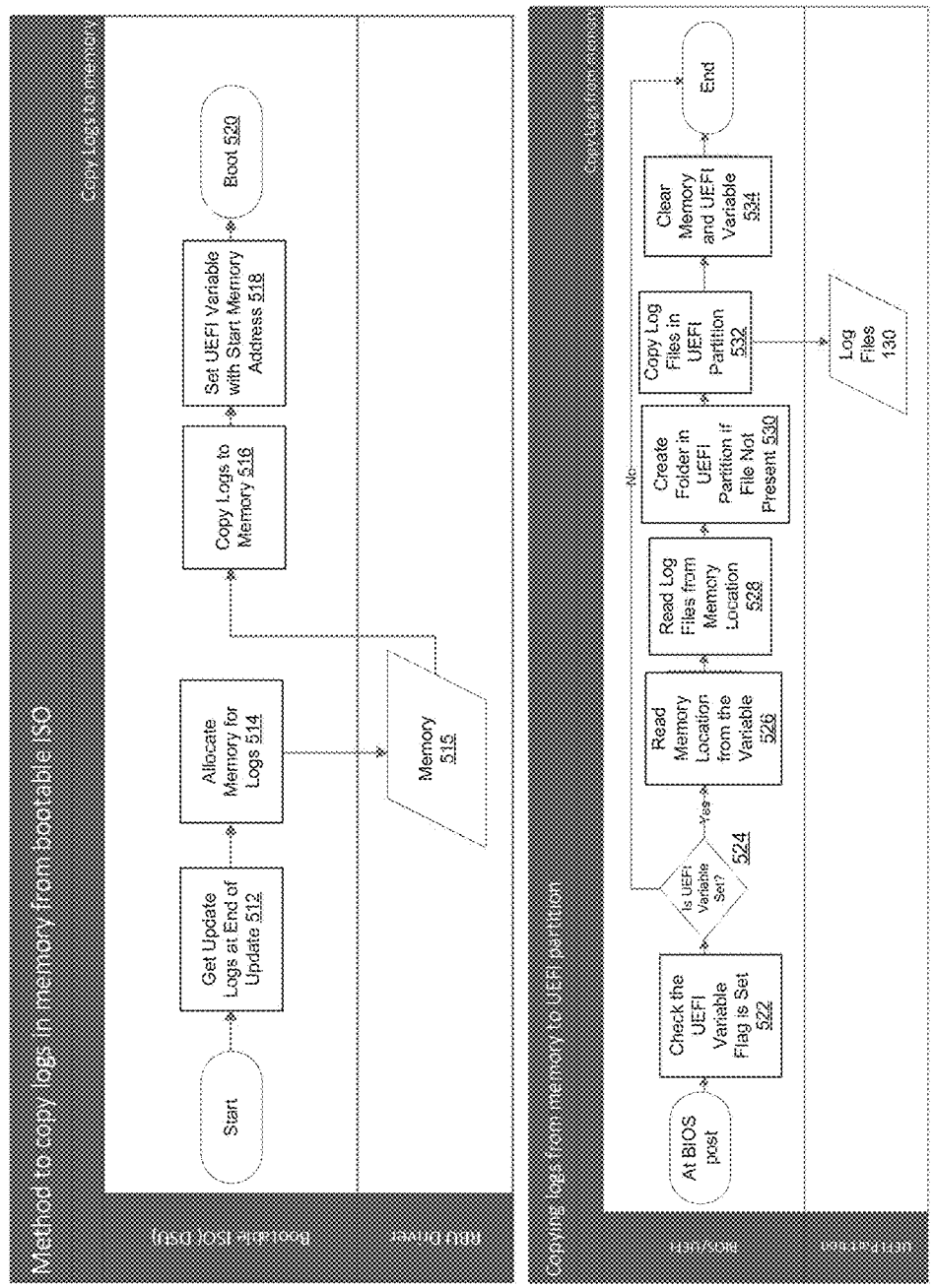
FIG. 5 illustrates an exemplary process diagram of operations to facilitate a process to transfer pre-operating system data to a persistent store, relative to an operation performed external to an operating system environment, in accordance with one or more embodiments described herein.

Referring next to still to the non-limiting system architecture 100 of FIG. 1, and now also to FIG. 5, illustrated is a flow diagram 500 of operations for facilitating a process to transfer pre-operating system data to a persistent store, relative to an operation performed external to an operating system environment. The flow diagram 500 is generally illustrated in accordance with the aforementioned embodiment B, but includes one or more operations and/or expands upon one or more details of one or more of the aforementioned operations relative to aforementioned embodiment B.

The flow diagram 500 includes obtaining update logs after an update. The obtaining (e.g., at 512) can be facilitated and/or performed by the storage component 108, and in one or more embodiments, can take place at least partially during the update. At 514, memory 515 can be allocated, such as by the storage component 108. The memory 515 can be the memory 106 or another memory that can be accessible to the OS, and thus accessible both in a pre-OS environment (e.g., via a bootable ISO) and in an OS environment (e.g., related to the OS). At 516, the logs can be copied, moved, sent and/or otherwise transferred to the memory 515, such as by the storage component 108.

At 518, a variable value can be set to identify the location of the logs in the memory 515. The variable value can include data and/or metadata, including any type of data in any suitable language. In one or more embodiments, the variable value (e.g., identifier) can be a unified extensible firmware interface (UEFI) variable, such as with a start memory address.

Accordingly, once the OS is booted and/or rebooted (e.g., at 520), the non-limiting system architecture 100 can check for whether or not a variable value is set (e.g., at 522). For example, a basic input/output system (BIOS) 116 can be employed to check if the variable value, such as the UEFI variable has a flag and/or other indicator set. This can be facilitated by the BIOS 116, such as at direction or triggering via the facilitation component 112 and/or data identification component 110. In one or more other embodiments, a BIOS can be configured to automatically check for such flags and/or identifiers upon boot, reboot, start and/or restart of the OS.

Depending on the decision 524, the process can continue. If a variable value, such as a UEFI variable is not set, then no further action can be taken. If a variable value, such as a UEFI variable is indeed set, then the process can proceed.

At 526, employing the variable, such as upon identification by the BIOS 116 and/or data identification component 110, a memory location can be read from the variable. In one or more embodiments, it will be appreciated that the BIOS 116 can be comprised by the data identification component 110. At 528, employing the BIOS 116 and/or facilitation component 112, log files can be read from the memory location (e.g., memory 515 at FIG. 5). At 530, a folder can be created in a UEFI partition if one is not already present for transfer of such pre-OS data, such as relative to a particular update. This file creation can be facilitated by the facilitation component 112.

At 532, logs can be copied, sent, moved and/or otherwise transferred from the memory 515 to the UEFI partition, such as by the facilitation component 112, thus creating log files including pre-OS data 130 that is accessible in the OS environment. At 534, the allocated memory can be cleared and released, and/or the variable value, such as UEFI variable, can be cleared, such as by the facilitation component 112.

Figure 6:
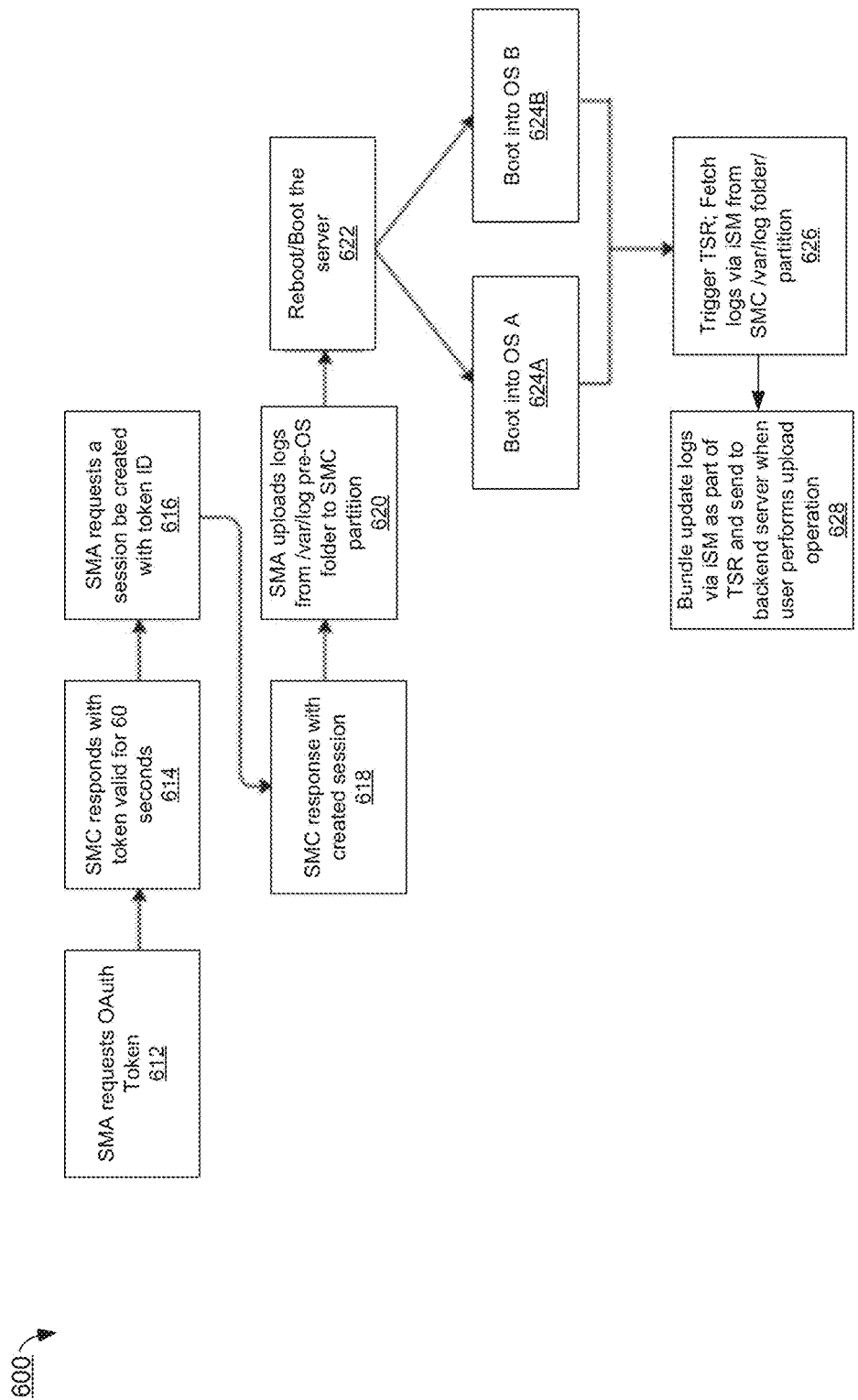
FIG. 6 illustrates an exemplary process diagram of operations to facilitate a process to transfer pre-operating system data to a persistent store, relative to an operation performed external to an operating system environment, in accordance with one or more embodiments described herein.

Referring next to still to the non-limiting system architecture 100 of FIG. 1, and now also to FIG. 6, illustrated is a flow diagram 600 of operations for facilitating a process to transfer pre-operating system data to a persistent store, relative to an operation performed external to an operating system environment. The flow diagram 600 is generally illustrated in accordance with the aforementioned embodiment C, but includes one or more operations and/or expands upon one or more details of one or more of the aforementioned operations relative to aforementioned embodiment C.

The flow diagram 600 includes one or more processes employing an authorization token and an application session to facilitate the transfer of pre-OS data from a temporary store to a persistent store. At 612, a request for an authorization token can be sent, such as via a system management application (SMA) 140.

The SMA 140 can be any suitable application and/or other software (e.g., intelligent platform management interface (IPMI)), that is operable relative to, such as on, a bootable ISO (pre-boot environment).

The authorization token can be a token (e.g., OAuth token) employed to prove an identity between consumer entities and service provider entities, for example. In one embodiment, this operation 612 can be facilitated by the facilitation component 112.

At 614, a system management controller (SMC) 142 can respond to the token. The token can be valid for any selectively determined quantity of time, such as 60 seconds. This time can be selectively set by an administrating entity, such as employing the facilitation component 112 and/or processor 104.

The SMC 142 can be a controller, such as a processor or other device, including suitable hardware and/or software, and being configured for employing secure local and remote device management, such as server management. The SMC 142 thus can have access to the non-limiting system architecture 100, such as also having access to the pre-OS data transfer system 102. For example, the SMC 142 can be employed to aid IT entities and/or other administrating entities to deploy, update and/or monitor applications and/or servers, such as employing one or more cloud services.

At 616, the SMA 140 can request that an application session, such as an HTTPS session, be created, such as by a suitable application programming interface (API). The application session can have an ID of the authorization token.

At 618, the SMC 142 can respond with an application ID, such as an HTTPS session application ID.

At 620, the pre-OS data, such as logs generated relative to one or more updates being/having been performed in a pre-OS environment, can be copied, sent, moved and/or otherwise transferred, such as by the SMA 140, into an SMC folder and/or partition, such as a /var/log folder and/or partition using the application ID. That is, the SMC folder and/or partition can be accessed both in the pre-OS environment and upon boot of the respective OS.

At 622, a respective system, such as a server, can be reboot/booted. Operation 624A can include booting a first type of OS, such as OS A, such as a Windows®-based OA. Operation 624B can include booting a second type of OS, such as OS B, such as a Linux®-based OS. All other OS types are envisioned.

At operation 626, a technical support report (TSR) can be triggered, such as by the facilitation component 112 and/or SMC 142. In response to the trigger, a light weight host OS agent, such as an information system manager (iSM), can fetch the pre-OS data from the logs from the SMC folder and/or partition, such as an SMC/var/log folder and/or partition. At operation 628, the iSM can bundle the update logs as part of the technical support report being generated, such as by the iSM. The TSR then can be sent for use, such as to a backend server, such as via the SMC 142, such as when an end user entity, such as employing the non-limiting system architecture 100, performs an upload operation.

Example Process Flows

Figure 7:
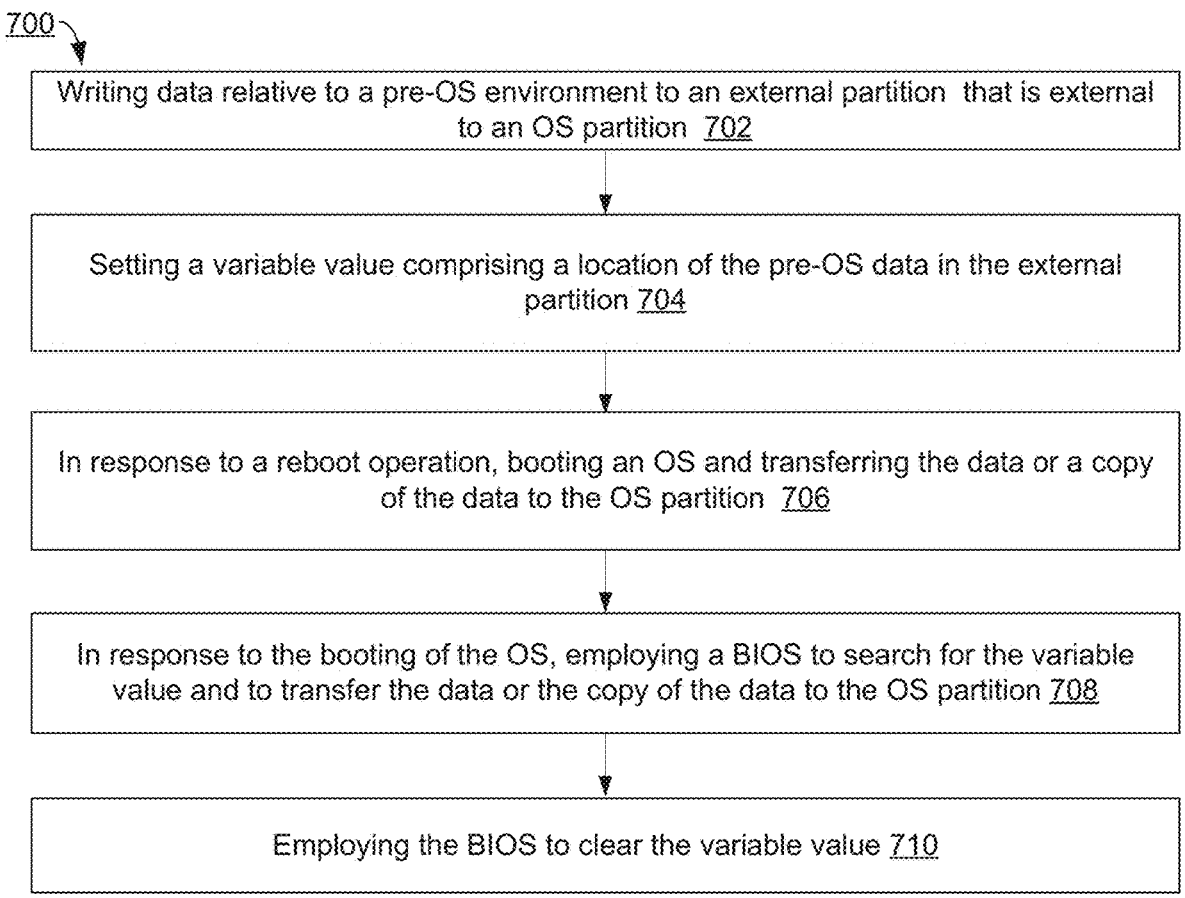
FIG. 7 illustrates an example process flow that can facilitate a process to transfer pre-operating system data to a persistent store, relative to an operation performed external to an operating system environment, in accordance with one or more embodiments described herein.

Turning now to FIG. 7, an example process flow is illustrated relative to the non-limiting system architecture 100 at FIG. 1. The process flow illustrated at FIG. 7 provides an example, non-limiting computer-implemented method 700 that can facilitate a process to transfer pre-operating system data to a persistent store, relative to an operation performed external to an operating system environment. Repetitive description of like elements and/or processes employed in respective embodiments is omitted for sake of brevity.

Operation 702 can comprise writing, by the system (e.g., storage component 108) data relative to a pre-operating system (pre-OS) environment to an external partition (e.g., external partition 120) that is external to an operating system (OS) partition (e.g., OS partition 122) of an OS (e.g., OS 114). The pre-OS data (e.g., pre-OS data 130) can comprise and/or be comprised by a log regarding pre-OS environment behavior, events or results. In one or more embodiments, the writing can comprise generating, by the system (e.g., storage component 108, and/or processor 104) the pre-OS data relative to an updating operation executed relative to the system (e.g., non-limiting system architecture 100).

Operation 704 can comprise setting, by the system (e.g., facilitation component 112) a variable value comprising a location of the pre-OS data in the external partition (e.g., partition 120).

Operation 706 can comprise in response to a reboot operation, booting, by the system (e.g., processor 104) an OS (e.g., OS 114) and transferring the data or a copy of the data to the OS partition (e.g., OS partition 122).

Operation 708 can comprise, in response to the booting of the OS, employing, by the system (e.g., processor 104 and/or facilitation component 112) a basic input/output system (BIOS 116) to search for the variable value and to transfer the data or the copy of the data to the OS partition (e.g., OS partition 122).

Operation 710 can comprise employing, by the system (e.g., processor 104 and/or facilitation component 112) the BIOS (e.g., BIOS 116) to clear the variable value.

Figure 8:
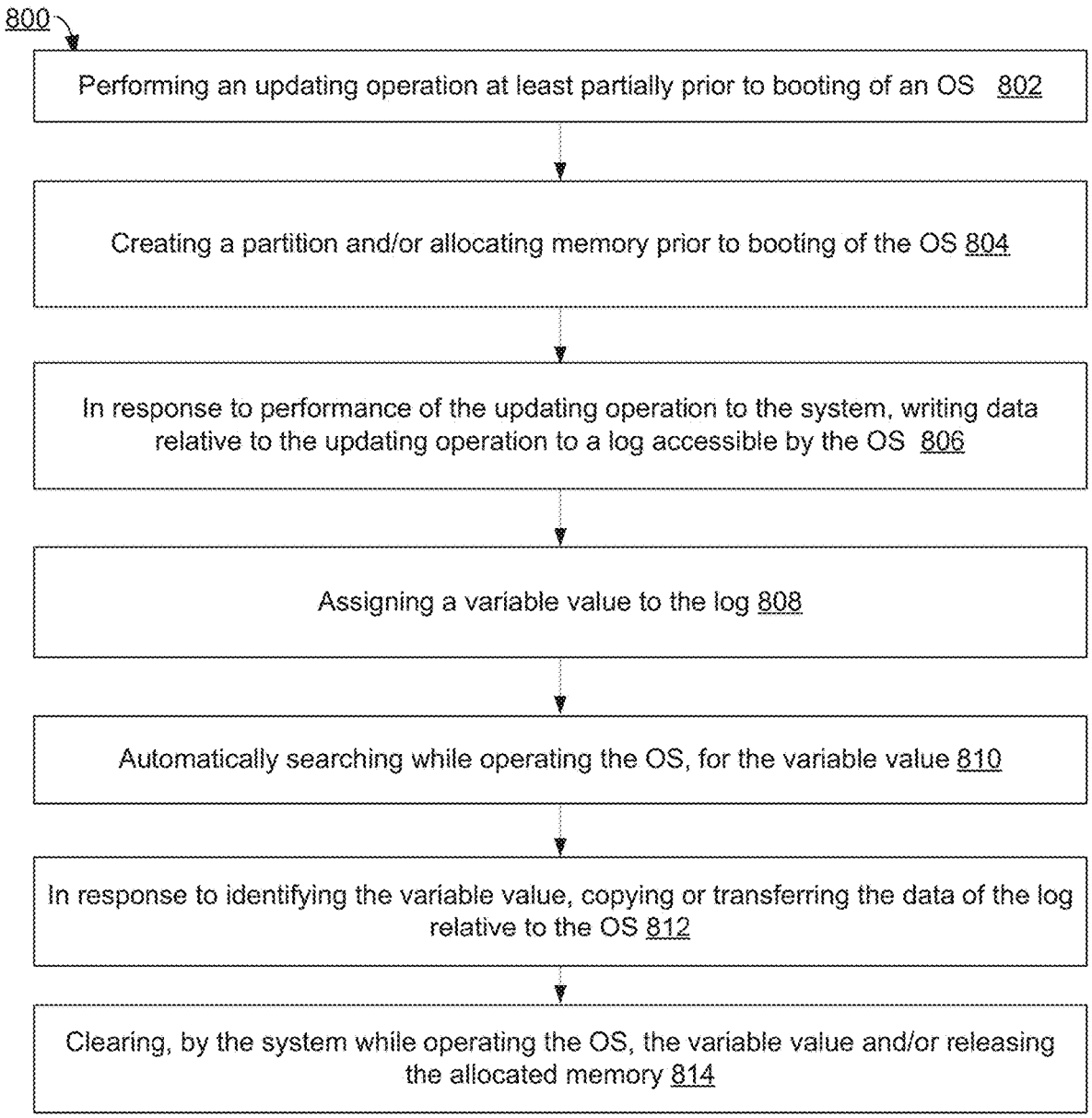
FIG. 8 illustrates another example process flow that can facilitate a process to transfer pre-operating system data to a persistent store, relative to an operation performed external to an operating system environment, in accordance with one or more embodiments described herein.

Turning next to FIG. 8, another example process flow is illustrated relative to the non-limiting system architecture 100 at FIG. 1. The process flow illustrated at FIG. 8 provides an example, non-limiting computer-implemented method 800 that can facilitate a process to transfer pre-operating system data to a persistent store, relative to an operation performed external to an operating system environment, in accordance with one or more embodiments described herein. Repetitive description of like elements and/or processes employed in respective embodiments is omitted for sake of brevity.

Operation 802 can comprise performing, by the system (e.g., processor 104), an updating operation at least partially prior to booting of an OS (e.g., OS 114).

Operation 804 can comprise creating, by the system (e.g., storage component 108), a partition (e.g., external partition 120) prior to booting of the OS. Alternatively, operation 804 can comprise allocating, by the system (e.g., processor 104 and/or storage component 108) memory (e.g., of memory 106) prior to booting of the OS.

Operation 806 can comprise in response to performance of the updating operation to the system, writing, by the system (e.g., storage component 108), data relative to the updating operation to a log accessible by the OS (e.g., OS 114). The writing can comprise writing, by the system (e.g., storage component 108) to a partition (e.g., external partition 120). The writing alternatively can comprise writing, by the system (e.g., storage component 108) the data to memory, such as including allocating memory. In such case, creating the partition can be omitted.

Operation 808 can comprise assigning, by the system (e.g., facilitation component 112), a variable value to the log.

Operation 810 can comprise, automatically searching, by the system (e.g., data identification component 110), while operating the OS, for the variable value.

Operation 812 can comprise, in response to identifying the variable value, copying or transferring by the system (e.g., facilitation system 112) the data of the log relative to the OS.

Operation 814 can comprise clearing, by the system (e.g., facilitation system 112), while operating the OS, the variable value. Additionally, and/or alternatively, operation 814 can comprise releasing, by the system (e.g., storage component 108), the allocated memory.

Figure 9:
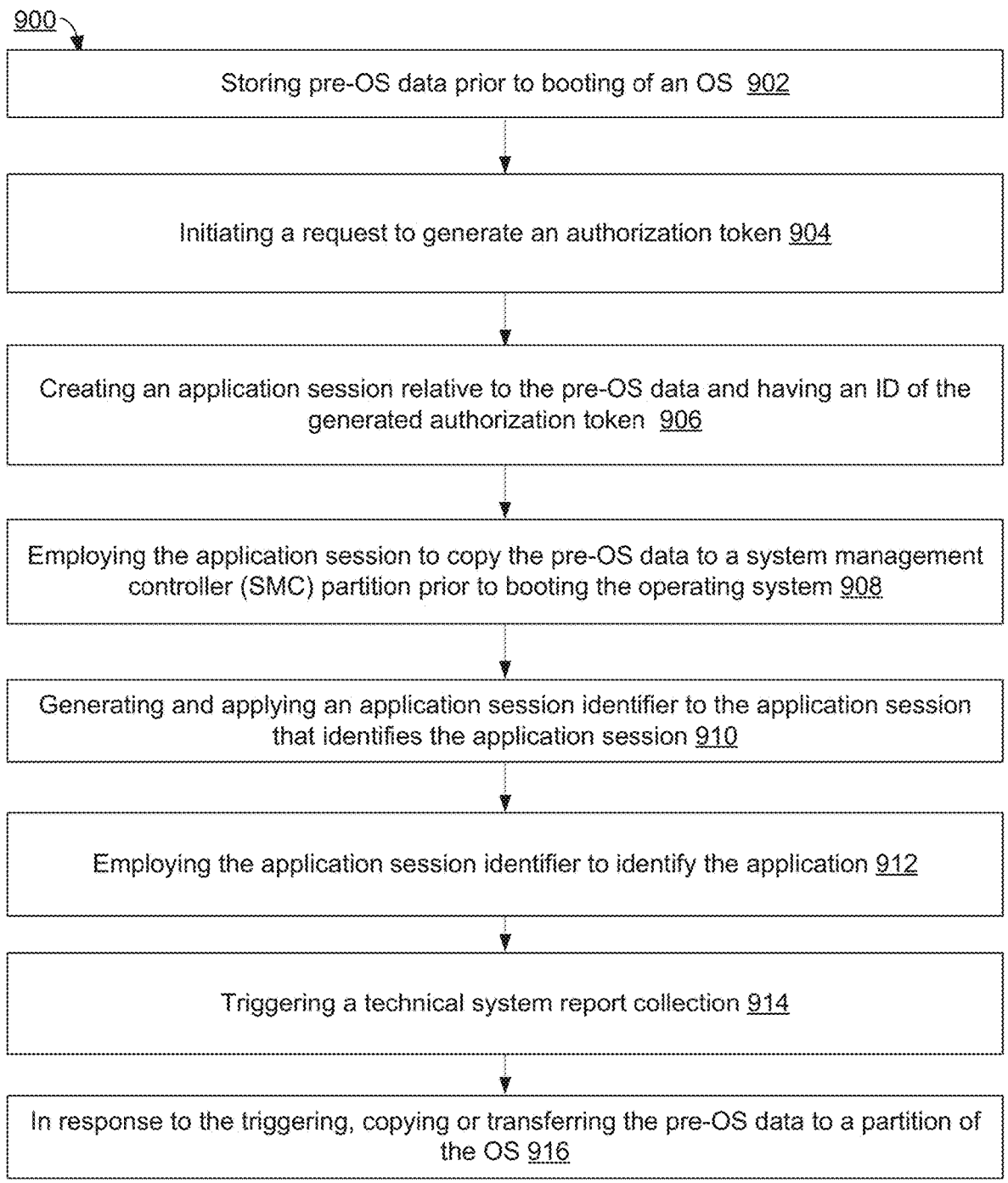
FIG. 9 illustrates yet another example process flow that can facilitate a process to transfer pre-operating system data to a persistent store, relative to an operation performed external to an operating system environment, in accordance with one or more embodiments described herein.

Referring now to FIG. 9, another example process flow is illustrated relative to the non-limiting system architecture 100 at FIG. 1. The process flow illustrated at FIG. 9 provides an example, non-limiting computer-implemented method 900 that can facilitate a process to transfer pre-operating system data to a persistent store, relative to an operation performed external to an operating system environment, in accordance with one or more embodiments described herein. Repetitive description of like elements and/or processes employed in respective embodiments is omitted for sake of brevity.

Operation 902 can comprise storing, by the system (e.g., storage component 108), pre-OS data prior to booting of an OS (e.g., OS 114), where the pre-OS data can comprise and/or be comprised by a log regarding pre-OS environment behavior, events or results.

Operation 904 can comprise, initiating, by the system (e.g., facilitation component 112), a request to generate an authorization token.

Operation 906 can comprise, creating by the system (e.g., facilitation component 112), an application session relative to the pre-OS data and having an ID of the generated authorization token.

Operation 908 can comprise, employing by the system (e.g., facilitation component 112), the application session to copy the pre-OS data to a system management application (e.g., SMC 142) partition prior to booting the operating system. The system management controller (SMC) 142 can be configured to access and make one or more changes to a system running the OS and to one or more additional systems.

Operation 910 can comprise, generating and applying by the system (e.g., facilitation component 112), an application session identifier to the application session that identifies the application session.

Operation 912 can comprise employing by the system (e.g., facilitation component 112), the application session identifier to identify the application session, such as by the system management application (e.g., SMA 140).

Operation 914 can comprise, triggering by the system (e.g., facilitation component 112), a technical system report collection.

Operation 916 can comprise in response to the triggering, copying or transferring by the system (e.g., facilitation component 112), the pre-OS data to a partition of the OS.

Comprehensive Summary

For simplicity of explanation, the computer-implemented methodologies provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. It can be appreciated that the operating procedures of process flows 300A, 300B, 300C, 700, 800 and/or 900 are example operating procedures, and that there can be embodiments that implement more or fewer operating procedures than are depicted.

Furthermore, not all illustrated acts can be utilized to implement the computer-implemented methodologies in accordance with the described subject matter. In addition, those skilled in the art will understand and appreciate that the computer-implemented methodologies could alternatively be represented as a series of interrelated states via a state diagram or events. Additionally, it should be further appreciated that the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, the one or more embodiments described herein can facilitate a process to transfer pre-operating system (pre-OS) data to a persistent store, relative to an operation performed external to an operating system (OS) environment. A non-limiting system architecture 100 can comprise a processor 104, and a memory 106 that stores computer executable instructions that, when executed by the processor 104, can facilitate performance of operations. The operations can comprise writing data 130 relative to a pre-OS environment to a partition 122 external to an OS partition 122, and, in response to a reboot operation, booting an OS 114 and transferring the data 130 or a copy of the data 130 to the OS partition 122.

Alternatively, the operations can comprise, writing data 130 relative to an updating operation to a log accessible by an OS 114 of the non-limiting system architecture 100, assigning a variable value to the log, automatically searching, while operating the OS 114, for the variable value, and in response to identifying the variable value, copying or transferring the data 130 of the log relative to the OS 114.

Alternatively, the operations can comprise storing pre-OS data 130, initiating a request to generate an authorization token, creating an application session relative to the pre-OS data 130 and having an ID of the generated authorization token, and employing the application session to copy the pre-OS data 130 to a system management controller 142 partition prior to booting the OS 114.

In view of employment of the one or more embodiments described herein, such as of the pre-OS data transfer system 102, data generated relative to one or more pre-OS operations, such as system, firmware and/or device updates can be retained and utilized after such operations commence. That is, such data can be stored and/or otherwise saved instead of being deleted, as in existing systems. The data, such as one or more logs and/or other reports can be employed to train, fix, repair, review and/or otherwise inform relative to the pre-OS operations and/or relative to future iterations of such pre-OS operations.

Indeed, a practical application of one or more techniques performed by one or more embodiments described herein can be saving and/or otherwise providing data for addressing one or more issues, failures and/or bugs relative to a pre-OS operation, such as a system, device and/or firmware update. Data generated relative to such update still can be removed and/or cleaned up relative to pre-OS storage, such as partitions. Yet, such data also can be transferred and/or copied to persistent storage accessible by one or more applications operating in an OS environment, such as after boot and/or reboot of such OS system.

In one example, as one real-world result of performance of operations described herein, one or more maintenance entities can reduce and/or altogether omit timely, costly and inefficient recreation of a pre-OS operation failure, issue and/or bug. That is, such recreation can be difficult if not impossible due in one or more cases to inability to ideally recreate all variables and/or inability to understand actual causation absent review of respective log data. Further, pre-OS storage space can be reclaimed. Further, damage to a reputation of a product, program, device, software and/or firmware having the failure, issue and/or bug can reduce and/or altogether prevented via efficient review and subsequent addressing of such failure, issue and/or bug, such as in minimal time, at minimal cost and/or with minimal effort. As used herein, cost can refer to power, money, memory, processing power and/or the like.

Moreover, it will be appreciated that a pre-OS data transfer system described herein can be implemented in one or more domains to enable scaled pre-OS data transfers. For example, the pre-OS data transfer system can facilitate a process to transfer plural pre-operating system datas, such as plural logs, to one or more persistent stores, relative to an operation performed external to an operating system environment. Likewise, the pre-OS data transfer system can facilitate plural such transfers in parallel. Further, the pre-OS data transfer system can facilitate one or more such transfers relative to one or more pre-OS operations (e.g., operations performed external to an operating system environment).

The systems and/or devices have been (and/or will be further) described herein with respect to interaction between one or more components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

It is to be appreciated that one or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the field of pre-OS and/or cloud native architectures and cannot be equally practicably implemented in a sensible way outside of a computing environment.

It also is to be appreciated that one or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively digitally store, copy and/or transfer pre-OS data in the time that one or more embodiments described herein can facilitate this process. And, neither can the human mind nor a human with pen and paper electronically digitally store, copy and/or transfer pre-OS data as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 10:
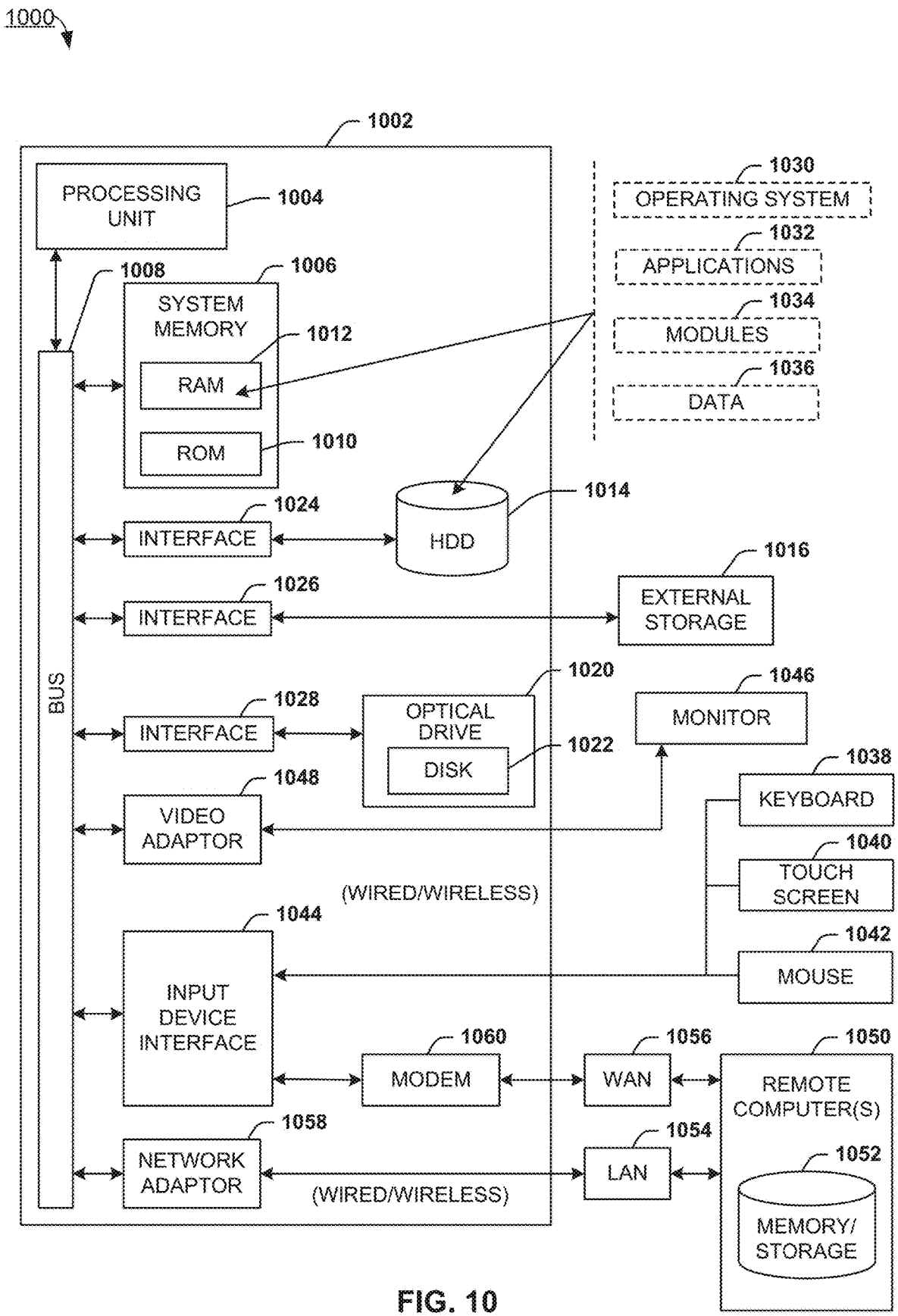
FIG. 10 illustrates an example block diagram of a computer system operable to execute one or more embodiments described herein.

To provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of pre-OS data transfer system 102 of FIG. 1. In some examples, computing environment 1000 can implement one or more embodiments of the process flows of FIGS. 7 to 9 to facilitate a process to transfer pre-OS data to a persistent store.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include machine-readable storage media, machine-readable storage media, and/or communications media, which two terms are used herein differently from one another as follows. Machine-readable storage media or machine-readable storage media can be any available storage media that can be accessed by the computer and includes both volatile and nonvolatile media, removable and nonremovable media. By way of example, and not limitation, machine-readable storage media or machine-readable storage media can be implemented in connection with any method or technology for storage of information such as machine-readable or machine-readable instructions, program modules, structured data or unstructured data.

Machine-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or machine-readable media, are to be understood to exclude only propagating transitory signals per se as modifiers and do not relinquish rights to all standard storage, memory or machine-readable media that are not only propagating transitory signals per se.

Machine-readable storage media can be accessed by one or more local or remote computing devices, e.g., via access requests, queries or other data retrieval protocols, for a variety of operations with respect to the information stored by the medium.

Communications media typically embody machine-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

Processing unit 1004 can comprise one or more types of processors and/or electronic circuitry (e.g., a classical processor, a quantum processor and/or like processor) that can implement one or more computer and/or machine readable, writable and/or executable components and/or instructions that can be stored at memory 1006. For example, processing unit 1004 can perform one or more operations that can be specified by computer and/or machine readable, writable and/or executable components and/or instructions including, but not limited to, logic, control, input/output (I/O), arithmetic and/or the like. In one or more embodiments, processing unit 1004 can be any of one or more commercially available processors. In one or more embodiments, processing unit 1004 can comprise one or more central processing unit, multi-core processor, microprocessor, dual microprocessors, microcontroller, System on a Chip (SOC), array processor, vector processor, quantum processor and/or another type of processor. The examples of processing unit 1004 can be employed to implement one or more embodiments described herein.

It will be appreciated that one or more aspects of the system memory 1006 or processing unit 1004 can be applied to memories such as 106 and/or respectively to processors such as 104, respectively of the non-limiting system architecture 100. It also will be appreciated that the system memory 1006 can be implemented in combination with and/or alternatively to memories such as 106. Likewise, it also will be appreciated that the processing unit 1004 can be implemented in combination with and/or alternatively to processors such as 104.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated machine-readable storage media provide nonvolatile storage of data, data structures, computer-executable instructions, and so forth. For the computer 1002, the drives and storage media accommodate the storage of any data in a suitable digital format. Although the description of machine-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or machine-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, a computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any machine-readable device or machine-readable storage/communications media. For example, computer readable storage media can include but are not limited to magnetic storage devices (e.g., hard disk, floppy disk, magnetic strips and/or the like), optical discs (e.g., CD, DVD and/or the like), smart cards, and flash memory devices (e.g., card, stick, key drive and/or the like). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   identifying data via a pre-operating system (pre-OS) computing environment,
   wherein the data corresponds to a failure of a pre-OS operation and describes an ordered set of occurrences at the pre-OS computing environment that correspond to the failure of the pre-OS operation;

writing the data from the pre-OS computing environment to a log at an external partition that is external to an operating system (OS) partition, setting a variable value, wherein the variable value defines a location of the data in the external partition; and in response to a reboot operation, identifying the variable value external to the log, locating the data based on the variable value, booting an OS corresponding to the OS partition, and transferring the data, or a copy of the data, to the OS partition.

2. The system of claim 1, wherein the operations further comprise:

creating the external partition prior to the booting of the OS.

3. The system of claim 1, wherein the data is comprised by the log, and wherein the data defines pre-OS computing environment behavior, events or results associated with the pre-OS computing environment.

4. The system of claim 1, wherein the operations further comprise:

assigning and storing the variable value while in the pre-OS computing environment, wherein the variable value comprises a start memory address.

5. The system of claim 1, wherein the operations further comprise:

in response to the booting of the OS, employing a basic input/output system (BIOS) to search for the variable value, locate the data at the location defined by the variable value, and transfer the data, or the copy of the data, to the OS partition.

6. The system of claim 5, wherein the operations further comprise:

employing the BIOS to clear the variable value after the transfer of the data, or the copy of the data, to the OS partition.

7. The system of claim 1, wherein the operations further comprise:

generating the data based on an updating operation executed at the system, wherein the updating operation is the failure operation.

8. The system of claim 1, wherein the operations further comprise:

triggering a technical system report collection upon booting of the OS; and in response to the triggering, copying or transferring the pre-OS data to the OS partition.

9. A non-transitory machine-readable medium, comprising executable instructions that, when executed by at least one processor facilitate performance of operations, comprising:

in response to execution of an updating operation to a system, identifying, at a pre-operating system (pre-OS) computing environment of the system, data that corresponds to a pre-OS operation failure corresponding to the updating operation, wherein the data describes an ordered set of occurrences at the pre-OS computing environment that correspond to the updating operation that failed;

writing the data to a log accessible by an operating system (OS) of the system;

assigning a variable value for the log;

storing the variable value separate from the log at a location external to the log that is accessible to the system;

in response to a booting of the OS, searching for the variable value; and in response to identifying the variable value by the searching, locating the log based on the variable value, and copying or transferring the data of the log relative to the OS.

10. The non-transitory machine-readable medium of claim 9, wherein the operations further comprise:

performing the updating operation at least partially prior to the booting of the OS.

11. The non-transitory machine-readable medium of claim 9, wherein the operations further comprise:

creating a partition prior to the booting of the OS, wherein the writing comprises writing the data to the log at the partition.

12. The non-transitory machine-readable medium of claim 9, wherein the operations further comprise:

while operating the OS and after the copying or transferring, clearing the variable value from storage.

13. A method, comprising:

performing, by a system comprising a processor, an updating operation to the system;

identifying, at a pre-operating system (pre-OS) computing environment of the system, data that corresponds to a failure of a pre-OS operation corresponding to the updating operation, wherein the data describes an ordered set of occurrences at the pre-OS computing environment that correspond to the pre-OS operation that failed;

writing the data to a log accessible by an operating system (OS) of the system;

assigning a variable value for the log;

storing the variable value separate from the log at a location external to the log that is known to the system;

booting the OS and automatically searching for and identifying the variable value; and in response to identifying the variable value, locating the log based on the variable value, and copying or transferring the data of the log relative to the OS.

14. The method of claim 13, further comprising:

assigning and storing the variable value while in the pre-OS computing environment, wherein the variable value comprises a start memory address; and determining whether any variable value, including the variable value, has been set.

15. The method of claim 13, further comprising:

performing the updating operation at least partially prior to booting of the OS.

16. The method of claim 13, further comprising:

creating, by the system, a partition prior to booting of the OS; and wherein the writing comprises writing the data to the log at the partition.

17. The method of claim 13, wherein the writing comprises writing the data to the log at a memory of the system.

18. The method of claim 13, wherein the automatically searching is performed at a selectively determined frequency.

19. The method of claim 13, wherein the data defines a pre-OS computing environment behavior, events or results.

20. The method of claim 13, further comprising:
   clearing while operating the OS, the variable value, after the copying or transferring.

\* \* \* \* \*